UNITED STATES PATENT OFFICE.

WILLIAM SCHIMMELPFENG, OF CHICAGO, ILLINOIS.

COMPOSITION OF MATTER FOR FIRE-PROOF COATING BUILDING MATERIAL, &c.

SPECIFICATION forming part of Letters Patent No. 344,409, dated June 29, 1886.

Application filed March 26, 1886. Serial No. 196,726. (No specimens.)

*To all whom it may concern:*

Be it known that I, WILLIAM SCHIMMELPFENG, a citizen of the United States of America, residing at Chicago, in the county of Cook, State of Illinois, have invented a new and useful Composition of Matter—an Incombustible Compound—of which the following is a specification.

My invention relates to an article of commerce—an improved fire-proof compound—consisting of matters of mineral properties combined with a chemical product and prepared either in liquid state for coating fabrics or materials, or as a plastic mass to be used as cement, or of solidified form in various shape as articles for ornament.

My composition consists of the following ingredients, combined in the proportions stated, viz: silicate of soda, thirty parts; fire-clay or silicate of alumina, two parts; mineral wool or sponge derived by process from quartzy specimen of minerals, fifteen parts; pure water, *quantum sufficit*. These ingredients have to be thoroughly mingled by agitation in the following manner: The silicate of soda has to be brought by the action of heat to boiling-point, and when the evaporation sets in pure water is added in small quantities until a satisfactory state of liquid is attained, and while in that condition taken off from the fire and mixed with the above-stated quantity of fire-clay, which previously, as well as the mineral wool, has been reduced to fine powder. After this is perfected the said mineral wool is added, and after thorough mingling these ingredients an incombustible liquid is compounded which has to be put up and safely kept in suitable vessel, air and water tight, ready for the use of coating textile fabrics or on building materials, especially to great advantage on iron structures of various design, as the surface of the metal undergoes oxidation in contact with the mixture under influence of moisture, and the coating hardens and adheres firmly, and in case of a conflagration the compound diffuses and the flames have no chance to take hold on the material for destruction or damaging the same.

Different shades in the color of the liquid are obtained by mixing more or less parts of the stated quantitative proportion of fire-clay, which results in a darker or lighter coloring, as may be desired.

In producing a plastic mass, instead of a liquid, as stated, the addition of pure water has to be omitted, and the bulk can be used as cement or molded in diverse form and shape, which soon assumes a solidified condition.

I am aware of the composition of mineral matters and chemical preparations together to be used as incombustible compounds; but I am not aware of compounding such products in the manner used for the purpose as described, nor the relative result of the aqueous fluid; therefore

What I claim, and desire to secure by Letters Patent of the United States, is—

The herein-described composition of matters to be used as a fire-proof compound, consisting of silicate of soda, fire-clay or silicate of alumina, water, and mineral wool or sponge, substantially as described, and in the proportions as specified.

In testimony that I claim the foregoing as my own I have hereunto affixed my signature in the presence of two subscribing witnesses.

WILLIAM SCHIMMELPFENG.

Witnesses:
ALBERT J. NORTON,
EDWARD J. WOODWARD.